Jan. 5, 1954 R. H. GRIFFIN 2,664,731
TRANSFER DEVICE FOR CONVEYERS
Filed Nov. 9, 1950 2 Sheets-Sheet 1
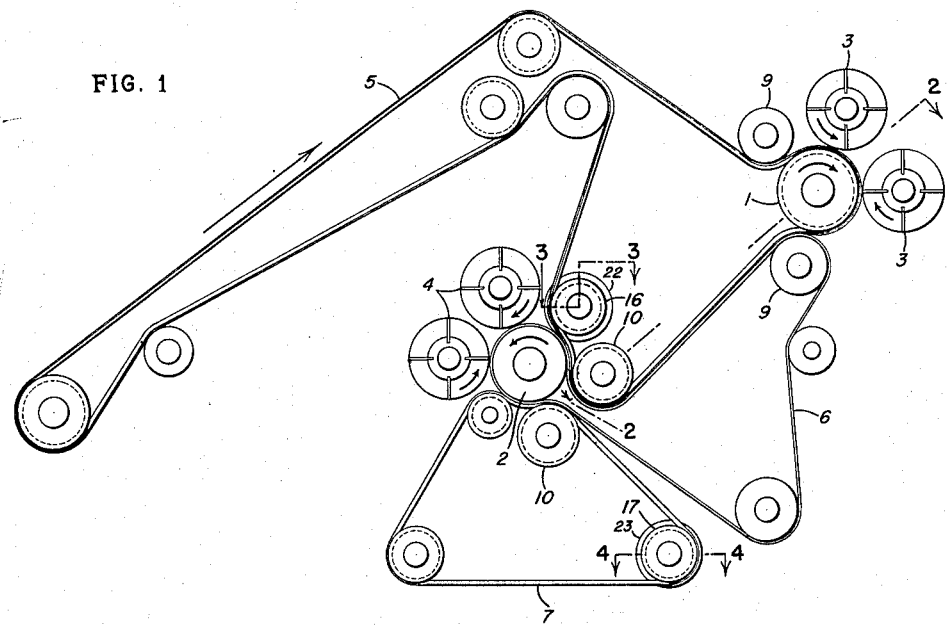
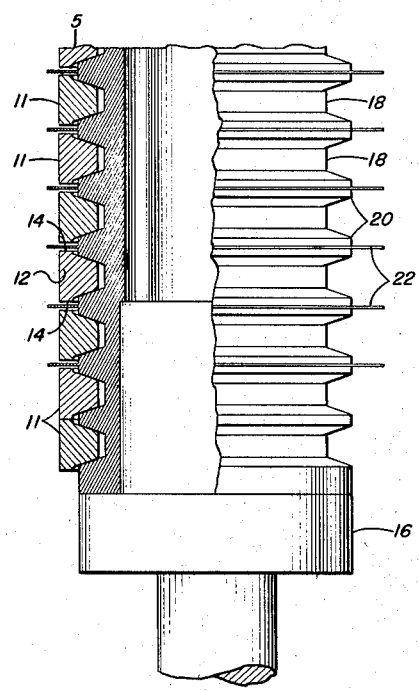
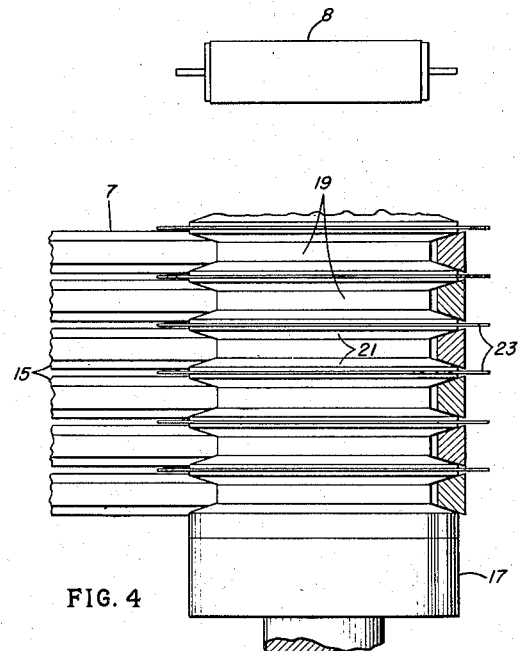
Inventor:
Robert H. Griffin
By Wilmer Mechlin
his Attorney Inventor:
Robert H. Griffin
By Wilmer Mechlin
his Attorney

Patented Jan. 5, 1954

2,664,731

UNITED STATES PATENT OFFICE 2,664,731

TRANSFER DEVICE FOR CONVEYERS

Robert H. Griffin, Yonkers, N. Y., assignor to Tanners' Research Corporation, New York, N. Y., a corporation of Delaware Application November 9, 1950, Serial No. 194,771

4 Claims. (Cl. 69—1)

This invention relates to conveyors and particularly to devices for transferring or detaching sheet work from endless conveyors.

In apparatus for treating or otherwise handling sheet work, wherein the work is carried by one or more endless conveyors, considerable difficulty has been experienced in detaching or separating the work from one to a succeeding conveyor or other work support. While of moment in handling continuous strip work, such as found in paper and steel making, only when a new strip is introduced, the problem is a constantly recurring one in apparatus for handling work in individual or interrupted sheet form, such as met in the tanning industry. The problem is further aggravated if, as in the case of the skins, hides and the like of the tanning industry, the work is often wet or tacky when handled and has correspondingly greater adhesion to a conveyor. A further complication arises in apparatus for automatically treating a succession of skins or other individual sheets of like limp character at one or more work stations, in which each such limp sheets must be transferred from a conveyor at a particular stage if uninterrupted operation is to be obtained.

It is therefore the primary object of the present invention to provide an improved device for positively transferring limp sheets from an endless conveyor.

Another object of the invention is to provide improved means for transferring limp sheets from one to a succeeding conveyor which permits an entire surface of the work to be exposed for subsequent treatment.

A further object of the invention is to provide a device for positively transferring limp sheets from a conveyor and which can be incorporated in one of the rolls by which the conveyor is guided.

An additional object of the invention is to provide a conveyor transfer device for endless conveyors whereby a conveyor can present a smooth uninterrupted surface for supporting limp sheets at a work station and, subsequently, will spread transversely to tauten the skin or sheets to assure a smooth condition thereof and, then, can be positively separated from the work, without encroachment upon the face of the work exposed for treatment.

Another object of the invention is to provide a succession of endless conveyors of improved arrangement and construction whereby limp sheets can be transferred effectively to a succeeding conveyor and can be supported at a plurality of work stations, such that the opposite faces of the work will be exposed in their entireties for treatment, each at one of the work stations.

Other objects and advantages of the invention will appear hereinafter in the detailed description, be particularly pointed out in the appended claims, and illustrated in the accompanying drawings, in which:

Figure 1 is a schematic view on a longitudinal section of apparatus employing a succession of endless conveyors embodying a preferred form of the improved transfer device of the present invention;

Figure 3 is a fragmentary horizontal sectional view on an enlarged scale, taken along the lines 3—3 of Figure 1; and Figure 4 is a fragmentary horizontal sectional view on an enlarged scale, taken along the lines 4—4 of Figure 1.

Figure 2:
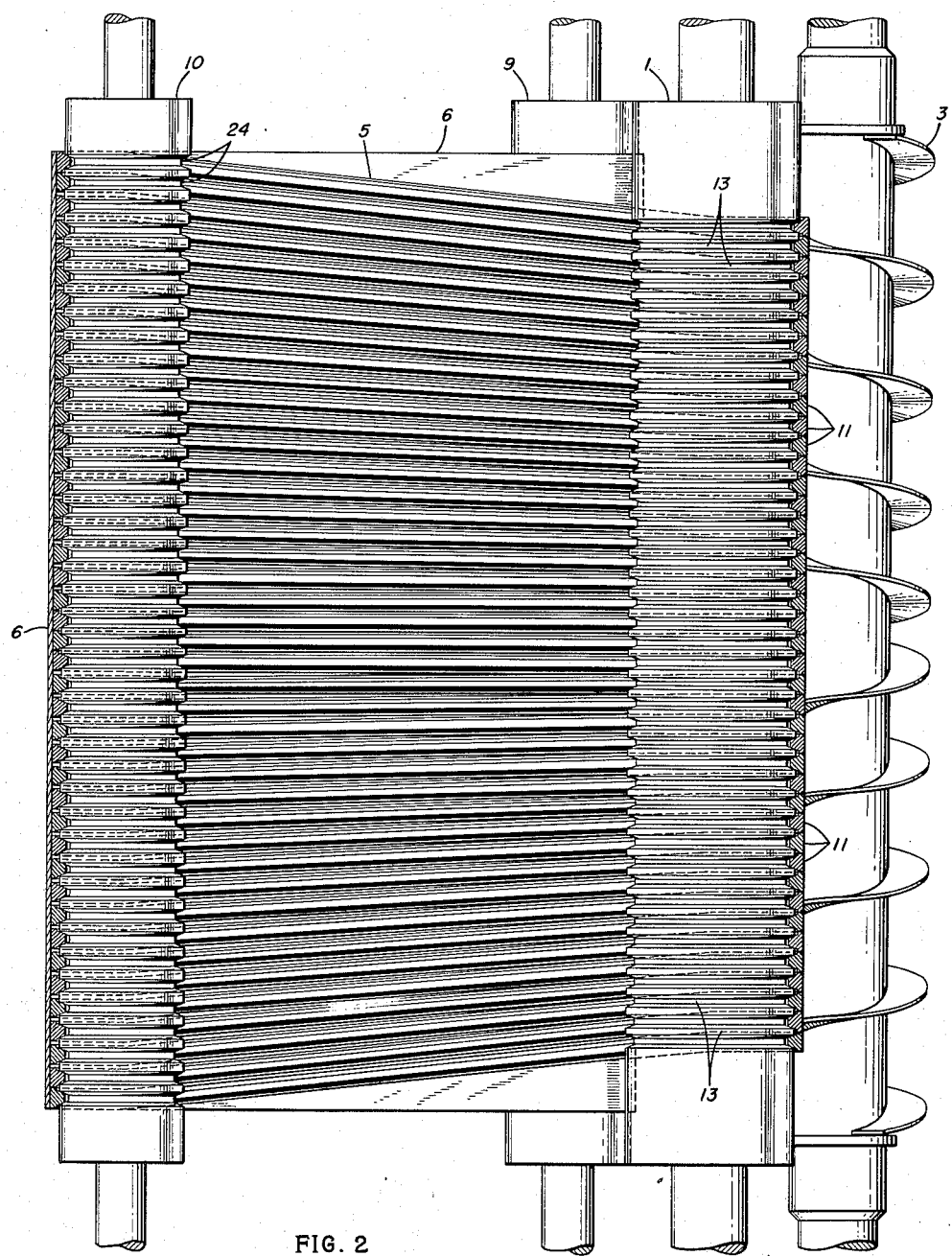
Figure 2 is a longitudinal sectional view on an enlarged scale, taken along the lines 2—2 of Figure 1.

Referring now in detail to the drawings, in which like reference characters designate like parts, the improved transfer device of the present invention has been applied for purposes of illustration to the Skin Treating Apparatus of my co-pending application, Serial No. 159,436 filed May 2, 1950. While particularly designed for treating skins, hides and the like, hereinafter termed skins, such apparatus is exemplary of both the simple and more complex conveyor systems for which the transfer device is adapted.

The illustrated apparatus is comprised of a pair of work-supporting drums 1 and 2 positioned at spaced treating zones in each of which a skin or other work is presented for treatment by suitable treating devices. In keeping with the "beamhouse" operations for which the apparatus of my co-pending application was particularly designed, the treating devices shown at each treating zone are a pair of counter-rotating cutters, designated 3 for the first or unhairing drum 1 and 4 for the second or fleshing drum 2.

For feeding the skins or other work to and through the apparatus, there are employed a series of endless conveyors, arranged to receive and support a skin in sequence. Of these, the first is a feed conveyor 5 which encircles the first drum 1 and by which work, introduced into the apparatus, is carried to and about that drum for treatment of its exposed face or side by the associated treating devices 3. Beyond the first drum the feed conveyor meets and facially engages a second or intermediate conveyor 6, between which and the feed conveyor 5, the work is carried to the second drum 2. Thereafter, these conveyors diverge and the intermediate conveyor 6, alone, carries the work about the second drum for treatment by the associated treating devices 4 of the face of the work opposite that exposed in the first treating zone. Beyond the treating devices 4 the intermediate conveyor 6 meets facially a third or end conveyor 7 by which the work is carried away from the second treating zone and ultimately deposited upon an underlying fourth or discharge conveyor 8 for discharge from the apparatus.

Where, as in the illustrated skin treating apparatus, it is desired that a side or face of a skin or other work be treated in its entirety at each treating zone, there are provided suitable means for gripping the work without encroaching upon its exposed surface, this function being performable for each drum 1 and 2 by the cooperative action of the cutters and a pair of grip rolls, numbered 9 and 10 for the first and second drums, respectively. Positioned about the associated drum in spaced stations, including therebetween the stations of the related cutters, and adapted to cause the associated conveyor to describe a reverse bend, the grip rolls of each drum securely grip work during its travel through the treating zone by the resultant partial wrap applied to the work in the manner explained in detail in the aforementioned co-pending application. Besides the drums and grip rolls, the feed and intermediate conveyors 5 and 6 are held or guided in their courses by suitable idler and driven rolls, like provision being made for guidance of the end and discharge conveyors 7 and 8.

Applying the above arrangement of conveyors specifically to the skins for which the apparatus is particularly designed, the skins from the batch to be treated are placed in succession upon the feed conveyor 5, usually wet from prior treatment, and preferably with their hair sides up or exposed to make use of the greater adhesion of the flesh side to the conveyor and minimize slippage. Unhaired in the first treating zone the skin has its exposed face reversed to present its flesh side for treatment at the second treating zone and, after both hair and flesh have been removed, is discharged from the apparatus by the discharge conveyor 8. Carried by the feed conveyor 5 or between it and the intermediate conveyor 6, a skin presents no difficulty in handling until its leading edge reaches the point of divergence of said two conveyors beyond the first of the grip rolls 10 of the second drum 2. There the greater adhesion of the flesh side of the skin to the conveyor, which was of advantage in feeding the skin to the first treating zone, becomes a liability due to the resultant tendency of the skin to continue to follow the feed conveyor. Between the intermediate and end conveyors 6 and 7 no difficulty is had due to the divergence of the conveyors and the overlying relation of the intermediate and end conveyors beyond the second treating zone which force the skin to drop from the intermediate to the end conveyor, even though it may temporarily adhere to the former. However, difficulty is again experienced between the end and discharge conveyors, again due to the greater adhesion developed by the flesh side which is then riding on the end conveyor 7, coupled with the necessity for dropping the skin substantially centrally of the discharge conveyor 8. Consequently, in the illustrated apparatus, provision must be made for ensuring transfer of a skin at the point of divergence of the feed and intermediate conveyors 5 and 6 and at the outlet end of the end conveyor 7. For such transfer the devices of the present invention are particularly adapted.

Both requiring means for detaching or separating the work therefrom, the feed and end conveyors, 5 and 7, respectively, of the illustrated apparatus are also exemplary of the two general types of conveyors by which the problem of transfer is presented. Thus, the feed conveyor 5 serves as the backing or supporting surface on which a skin is directly supported during its treatment in the first treating zone, this for skins and for most other treatments of work requiring a smooth uninterrupted surface. The end conveyor 7, on the other hand, handles work subsequent to treatment and therefore need not be uninterrupted so long as its surface is adequate for support. A conveyor divided transversely into a plurality of individual strips or segments arranged side-by-side or in flanking relation has been found to be particularly suited for both types of applications.

In order to maintain them in their proper channels or paths, transversely or laterally of the conveyor, it is preferred that V-belts be used as the individual segments or strips 11 making up the conveyor and that the drum and the several included rolls or rollers about which the belts ride be correspondingly grooved. To enable the feed conveyor 5 to serve as the work-supporting surface during treatment the V-belts 11 of this conveyor are of special section with parallel-sided upper, cap or head portions 12 which, from the feed end of the conveyor through the treating zone of the associated drum 1, ride in annular grooves or slots 13 in the drum and like grooves in the preceding included guide members, these grooves being so spaced as to hold the confronting parallel sides 14 of the belts in lateral alignment and close contact or abutting relation and the head portions 12 then providing the desired smooth uninterrupted surface. To render this surface yieldable, as well, so that it can compensate for inequalities in thickness of the work, such as experienced in treating skins, the V-belts 11 of the feed roll preferably are made of rubber or like resilient or yieldable material and may be reinforced longitudinally by embedded wires (not shown) of steel or other like material in the usual manner. For the end conveyor 7 in which this smooth support during treatment is not a factor, the individual segments or V-belts 15 may be of the usual truncated V-section.

For separating or detaching work from the feed and end conveyors 5 and 7 and transferring it to the succeeding conveyor at the aforementioned critical points, there is provided for each of these points a transfer pulley or roll, these pulleys being numbered 16 for the feed conveyor and 17 for the end conveyor and each engaging the inner side of the associated conveyor. As shown in Figures 3 and 4, the transfer pulleys 16 and 17 are provided, respectively, with a plurality of axially or transversely spaced annular or circumferential grooves, 18 and 19, in which their associated V-belts ride. Unlike the other grooved members, the pulleys 16 and 17 have formed integrally with or attached to the outer face or rim of each of their groove separating ribs, 20 and 21, respectively, an annular transfer or detaching ring, collar or flange member. These transfer rings, numbered 22 and 23, respectively, for the transfer pulleys 16 and 17, project radially between the V-belts some distance beyond the outer sides or surfaces of the latter. With the transfer pulleys so constructed, the transfer rings will engage the underside of the skin or other work as it reaches the station or position of the associated transfer pulley and roll, lift or raise the skin above the outer level of the V-belts thereby effectively separating, detaching or transferring the leading edge of the skin from the underlying conveyor, this rolling transfer or separation continuing throughout the length of the skin.

The difference in function of the feed and end conveyors, 5 and 7, which was responsible for the difference in shape of the associated V-belts also gave rise to a difference in the relation of these belts. Spacing of the V-belts 15 of the end conveyor not being objectionable, these belts are spaced uniformly throughout the path of the conveyor sufficiently to accommodate the associated transfer rings 23, these belts thus always travelling in parallel paths. However, the V-belts 11 of the feed conveyor are in abutting relation as they pass over the first drum 1 to provide a smooth uninterrupted treating surface and must be separated therebeyond to accommodate the transfer ring 22 of the related transfer pulley 16, this lateral outward spreading of the belts 11 also tautens the skins or limp sheets adhering thereto so as to maintain the skins or limp sheets in a smooth condition on the conveyor. The mode of accomplishment of this separation is illustrated in Figure 2. As there shown, the grooves 13 of the drum are closely spaced to hold the V-belts in side contact as the belts pass around said drum, but the grooves 24 of the first of the grip rolls 10 associated with the second drum 2, over which the feed conveyor 5 passes as it reaches the second drum 2, are spaced at greater distances outwardly of the transverse center line of the roll to cause the V-belts 11 to spread or diverge outwardly of this center line between the first drum 1 and this grip roll 10 sufficiently to accommodate the transfer rings 22 and 23 therebetween, this spacing also being maintained in the grooves 18 of the transfer pulley 16. Thereafter, the V-belts 11 are caused to converge by a corresponding decrease in spacing of the grooves of the guide pulleys therebeyond.

It will be noted that the transfer pulley 16 has no transfer rings over its central portion and at either side. While of no import where the spreading occurs over a considerable distance, the restricted space available for this purpose in the machine of the illustrated embodiment is such that were all of the belts spread, the angularity of the outer belts relative to the grip roll 10 would tend to cause them to ride out of their grooves. Wherefore, to minimize the angularity of the outer belts the central portion of the transfer pulley is made without transfer rings and its grooves are so spaced as to maintain the corresponding belts in side contact. By holding the span of this unringed central portion within the minimum width of the corresponding portion of any of the material undergoing treatment, dependence can be placed upon the adjoining transfer rings to detach the intervening portion of the material. To decrease the overall spreading further, no rings are used adjacent either end of the pulley since they would be well beyond the lateral extremities of any work and thus serve no useful purpose.

From the above detailed description it will be apparent that there has been provided an improved transfer device for positively detaching work from an endless conveyor, which is adapted to be used wherever such detachment is necessitated by the nature of the work or the disposition of the conveyor relative to the support to which the work is to be transferred. It should be understood that the described and disclosed embodiment is merely exemplary of the invention and that all modifications are intended to be included which do not depart either from the spirit of the invention or the scope of the appended claims.

Having described my invention, I claim:

1. In apparatus for conveying limp sheet material and having a material treating zone, the combination of a conveyor formed of a plurality of flanking belts for conveying said material to said treating zone and beyond said treating zone, means for maintaining said belts in side contact over said treating zone to provide a smooth uninterrupted material supporting surface, means for spreading certain of said belts laterally from said treating zone to a point beyond said zone, and rotary means positioned beyond said treating zone and projecting between said certain belts beyond material supporting surface of said conveyor for progressively detaching work from said side.

2. In apparatus for conveying limp sheet material and having a material treating zone, the combination of a conveyor formed of a plurality of flanking belts for conveying said material to said treating zone and beyond said treating zone, means for maintaining said belts in side contact over said treating zone to provide a smooth uninterrupted material supporting surface, means for spreading certain of said belts laterally from said treating zone to a point beyond said zone, rotary means engaging a side of said conveyor beyond said zone, and transfer means carried by said rotary means and projecting between said certain belts beyond an opposite material supporting side of said conveyor for progressively detaching work from said opposite side.

3. In apparatus for conveying limp sheet material and having a material treating zone, the combination of a conveyor formed of a plurality of flanking endless belts each having parallel sided outer portions for conveying said material to said treating zone and beyond said treating zone, means for maintaining said outer portions of said belts in side contact over said treating zone to provide a smooth uninterrupted material supporting surface, a roller over which is trained said conveyor and disposed at a point beyond said treating zone, means causing certain of said belts to diverge laterally between said treating zone and roller to tauten said limp material transversely to smooth the latter, and transfer rings carried by said roller and projecting between certain belts beyond material supporting surface of said conveyor for progressively detaching work from said opposite side.

4. In apparatus having a treating zone, the combination of a conveyor formed of a plurality of flanking endless belts each having parallel sided outer portions, means for maintaining said outer portions of said belts in side contact over said treating zone, a roller engaging a side of said conveyor beyond said treating zone, means for causing said belts to diverge laterally between said treating zone and roller, and transfer rings carried by said roller and projecting between said belts beyond an opposite side of said conveyor for progressively detaching work from said opposite side.

ROBERT H. GRIFFIN.

References Cited in the file of this patent

UNITED STATES PATENTS

| Number | Name | Date |
| --- | --- | --- |
| 2,208,433 | Seft | July 16, 1940 |
| 2,410,611 | Pratt | Nov. 5, 1946 |
| 2,421,874 | Fouse | June 10, 1947 |